United States Patent
Miglietti (10) Patent No.: US 6,520,401 B1
(45) Date of Patent: Feb. 18, 2003

(54) DIFFUSION BONDING OF GAPS

(75) Inventor: Warren Martin Andre Miglietti, Manchester, CT (US)

(73) Assignee: Sermatech International, Inc., Limerick, PA (US)

( * ) Notice: Subject to any disclaimer, the term of this patent is extended or adjusted under 35 U.S.C. 154(b) by 0 days.

(21) Appl. No.: 09/947,889

(22) Filed: Sep. 6, 2001

(51) Int. Cl.⁷ .......................... B23K 20/22; B23K 31/02
(52) U.S. Cl. .................. 228/194; 228/233.2; 228/248.1
(58) Field of Search .............................. 228/119, 111.5, 228/193, 195, 194, 248.1, 248.5, 233.2, 234.1

(56) References Cited

U.S. PATENT DOCUMENTS

| | | | |
|---|---|---|---|
| 3,496,630 A | | 2/1970 | Duff et al. ..................... 29/487 |
| 4,008,844 A | | 2/1977 | Duvall et al. ................ 228/119 |
| 4,614,296 A | * | 9/1986 | Lesgourgues ............... 228/119 |
| 4,910,098 A | * | 3/1990 | Lee et al. ............... 228/262.31 |
| 5,156,321 A | | 10/1992 | Liburdi et al. ............... 228/119 |
| 5,240,491 A | * | 8/1993 | Budinger et al. ........... 228/119 |
| 5,273,204 A | * | 12/1993 | Dalal et al. ................. 228/165 |
| 5,523,169 A | * | 6/1996 | Rafferty et al. .......... 29/402.09 |
| 5,614,039 A | * | 3/1997 | Nayar et al. ................ 148/600 |
| 5,806,751 A | * | 9/1998 | Schaefer et al. ............ 228/119 |
| 5,836,075 A | * | 11/1998 | Fitzgerald et al. ......... 29/889.2 |
| 6,199,747 B1 | * | 3/2001 | Cohn et al. ................. 228/119 |
| 6,223,976 B1 | * | 5/2001 | Clement et al. ............. 228/181 |

FOREIGN PATENT DOCUMENTS

| | | | |
|---|---|---|---|
| JP | 55054262 A | * | 4/1980 |
| JP | 411043706 A | * | 2/1999 |

OTHER PUBLICATIONS

Miglietti et al., *Liquid Phase Diffusion Bond Repair of Westinghouse 501F, Row 3 Vanes*, ASME paper 2000–GT–339, International Gas Turbine & Aeroengine Congress & Exhibition, Munich, Germany, May 2000.

Miglietti, *Wide Gap Diffusion Braze Repair of Co–Based Industrial Turbine Blades*, International Brazing and Soldering Conference, Albuquerque NM, Apr. 2000.

* cited by examiner

*Primary Examiner*—Tom Dunn
*Assistant Examiner*—Kiley Stoner
(74) *Attorney, Agent, or Firm*—Drinker Biddle & Reath LLP (57) ABSTRACT

A process for diffusion bonding of cracks and other gaps in high-temperature nickel and cobalt alloy components is described. The gap is filled with alloy powder matching the substrate alloy, or with an alloy of superior properties, such as MAR-M 247, MAR-M 247LC, or CM 247LC. A braze containing a melting point depressant is either mixed into the alloy powder or applied over it. The depressant is preferably hafnium, zirconium, or low boron. The component is heated for 15–45 minutes above the melting point of the braze, which fills the spaces between the alloy powder particles. The component is diffused at a temperature above or below the liquidus of the braze and solution heat-treated and aged at a temperature at which the braze and alloy mixture in the gap is solid, but the depressant diffuses away.

24 Claims, 2 Drawing Sheets

DIFFUSION BONDING OF GAPS

FIELD OF THE INVENTION

The present invention relates generally to the field of diffusion bonding of cracks and joints in metal substrates, and especially to diffusion bonding for nickel alloy- or cobalt alloy-containing substrates used in the manufacture of, for example, Industrial Gas Turbine, Aeroderivative Gas Turbine and Aircraft Gas Turbine components.

BACKGROUND OF THE INVENTION

In a modern gas turbine engine, components such as blades, vanes, combustor cases and the like are usually made from nickel and cobalt alloys. Nickel and cobalt-based superalloys are most often used to fabricate gas turbine parts because of the high strength required for long periods of service at the high temperatures characteristic of turbine operation.

In use, these components sometimes experience cracking as a result of thermal fatigue, pitting from corrosion/oxidation processes, and dents from foreign object impacts. In order to prolong the useful life of the components, it is desirable to fill the cracks and other damage with a material that will bond to the substrate alloy, and will restore, at least to a substantial extent, both the shape and the strength of the cracked metal or component.

U.S. Pat. No. 3,496,630 (Duff et al.) describes a process for joining parts by brazing in which the joint is filled by a mixture of two metal powders having different melting points. The joint is heated to a temperature at which one of the powders melts to braze the joint. The two powders then merge by diffusion to form an alloy with a higher melting point.

U.S. Pat. No. 4,008,844 (Duvall et al.) describes a process in which cracks are filled with a mixture of metal powders, one of which contains boron as a melting point depressant. The repair is heated to a temperature at which that powder initially melts, then solidifies isothermally as the boron diffuses away. Duff et al.'s and Duvall et al.'s processes have been found in practice to be most suitable for repairing cracks of width 25 $\mu$m to 250 $\mu$m (0.001" to 0.010").

U.S. Pat. No. 5,156,321 (Liburdi) describes a process in which joints and cracks in nickel-based alloy components are filled with a nickel alloy powder of similar composition to the base alloy of the components. This powder is partially solid state sintered to form a solid but porous fill in the crack. Then, a layer of braze alloy of similar composition, but with the addition of at least 1% B and 1% Si, or up to 10% Si, to reduce its melting point is applied. This is then sintered at a temperature at which the braze alloy melts, forming a non-porous surface that seals the crack. The repair is then subjected to hot isostatic pressing, which collapses the porous interior of the repair, allowing it to diffusion-bond and form a solid repair. In some examples, the braze layer is applied before the first sintering step: the first sintering step is then at a temperature below the melting point of the braze.

Miglietti et al., Liquid Phase Diffusion Bond Repair of Westinghouse 501F, Row 3 Vanes, ASME paper 2000-GT-339, reports experimental results using a single-stage liquid-phase diffusion sintering process to repair cracks in a component made of X-45 cobalt superalloy. The composition of the filler paste used is not explained in detail, but it apparently contains Co, Ni, Cr, Al, Ta, W, Zr, Ti, and B. It has been found necessary with this process to maintain the component at liquid sintering temperatures for 24–48 hours to promote diffusion of the boron away from the filler. With this composition the boron is the primary melting point depressant.

The repairs reported by Miglietti et al. had tensile and yield strengths allegedly equivalent to the values quoted in the Metals Handbook for the base alloys being repaired, but had a low ductility, typically 25–51% of the values quoted in the Metals Handbook for the base alloy. This low ductility is believed to be due to the presence of boride phases. $Ni_3B$ has a Vickers hardness with a 50-g load of 883 HVN. At the time, this was not believed to be a problem. However, we have now discovered that increasing the ductility of the filling material in this sort of repair can substantially improve the performance of the repaired component in actual use. Low cycle fatigue (LCF) and thermal fatigue (TF) properties are strongly influenced by ductility, in that a material with higher ductility will have superior LCF and TF properties. Phosphorus and silicon have also been used as melting point depressants, but these also form hard, brittle eutectic phases. Phosphides and silicides are even more brittle than borides, and the larger phosphorus and silicon atoms diffuse away less readily than boron atoms.

SUMMARY OF THE INVENTION

The invention provides processes for liquid phase diffusion bonding of metal or alloy parts that use less boron or other melting point depressants so as to reduce the formation of brittle phases in the joint.

In one aspect, the invention provides a process for liquid phase diffusion bonding of a metal or alloy substrate, comprising filling a gap with a metal or alloy powder substantially free from melting point depressants. The powder may be similar in composition to the substrate, but is preferably MAR-M 247, MAR-M 247LC, or CM 247LC when repairing a Ni-based superalloy substrate, and MAR-M 509 when repairing a Co-based superalloy substrate. A braze consisting of a metal or alloy containing an effective quantity of a melting point depressant is applied over the alloy powder. In a first heating stage, a temperature above the liquidus of the braze and below the melting point of the powder is maintained for a period sufficient for the braze to infiltrate the spaces within the metal powder. In a subsequent heating stage a temperature below the liquidus of the fill is maintained while diffusion of the melting point depressant occurs.

In another aspect of the invention, a gap in a nickel- or cobalt-based metal or alloy substrate is filled with a powder substantially free from melting point depressants. The powder may be similar in composition to the substrate, but is preferably MAR-M 247, MAR-M 247LC, or CM 247LC when repairing a Ni-based superalloy substrate, and MAR-M 509 when repairing a Co-based superalloy substrate. A braze containing an effective quantity of a melting point depressant selected from the group consisting of zirconium and hafnium is applied over the metal or alloy powder. In a first heating stage a temperature above the liquidus of the braze and below the melting point of the powder is maintained for a period sufficient for the braze to infiltrate the spaces within the metal powder. In a subsequent heating stage, a temperature below the liquidus of the combined braze and powder is maintained while substantial diffusion of the melting point depressant occurs.

The effective quantity of the melting point depressant must reduce the melting point or liquidus of the braze sufficiently that the molten braze can infiltrate the spaces within the metal powder without the base metal of the component under repair being heated sufficiently to cause incipient melting or other deterioration. It will be appreciated by those skilled in the art that the exact amount of melting point depressant needed will depend not only on the specific compositions of the base metal, the filler powder, and the braze, but also on the intended use of the component under repair, which affects the amount of deterioration that can be tolerated.

Where the substrate is nickel-based, the braze preferably consists essentially of nickel with from 26% to 34% by weight of hafnium, corresponding to a melting point from 1190° C. to 1260° C., or from 11% to 19% or from 40% to 60% by weight of zirconium, corresponding to a melting point of from 1170° C. to 1260° C. A melting point of 1260° C. is considered to be the maximum that is acceptable, to allow the liquid phase sintering to take place without incipient melting of the article being repaired. A braze containing both hafnium and zirconium, in quantities that are effective as a melting point depressant in combination, is also possible. A braze mixing Zr and/or Hf with other melting point depressants would be possible, but is less preferred, because using appreciable quantities of known melting point depressants such as boron will tend to introduce the undesirable properties that have been discovered to arise from those materials.

However, where this aspect of the invention is not applied, other aspects of the invention may be put into effect with, for example, a braze consisting of Ni, Co, Cr, Al, Ta, Mo, W, Y, Zr, Hf, and B, for a nickel-based substrate, or a braze consisting of Co, Ni, Cr, Al, Ta, W, Zr, Ti, and B, for a cobalt-based substrate. The braze may contain 1.5% B and 1.5% Zr and/or Hf. In that case, the B will be the primary melting point depressant. 1.5% by weight of boron reduces the melting point by about 160° C. 1.5% Zr and/or Hf has very little effect on the melting point of the braze, reducing it by no more than 40° C. The Zr is useful because it improves the elongation, the stress rupture life, and the overall life of the joint. The Hf is useful because it strengthens the γ' phase (in which Hf is highly soluble), because it is an active carbide former and forms a uniform dispersion of carbides along the grain boundaries, because it increases the oxidation resistance of the brazed joint, and because it facilitates coating the brazed joint with an aluminide coating. Hf and Zr also form ductile $Ni_5Hf$ and $Ni_5Zr$ phases, which improve the overall ductility of the repair.

It is believed that other melting point depressants, including scandium, selenium, and titanium may be usable instead of or in addition to Zr and/or Hf. However, although published data indicate that those elements have a suitable effect on the melting point of Ni and/or Co, it is not yet certain which of them form alloy phases with the desired ductility and other mechanical properties. The ductility of the repaired joint should be at least 3%, and a ductility of at least 5% is very strongly preferred.

In another aspect of the invention, a gap in a nickel- or cobalt-based metal or alloy substrate is filled with a powder similar in composition to the substrate and substantially free from melting point depressants. A braze containing an effective quantity of a melting point depressant is applied over the metal or alloy powder. In a first heating stage a temperature above the liquidus of the braze and below the melting point of the powder is maintained for a period sufficient for the braze to infiltrate the spaces within the metal powder. In a subsequent heating stage, a temperature below the liquidus of the combined braze and powder is maintained while substantial diffusion of the melting point depressant occurs. The melting point depressant is selected from materials that form with the substrate material phases having a ductility at least comparable with the ductility of the substrate material.

In a further aspect of the invention, a method of liquid phase diffusion bonding of a metal or alloy substrate comprises filling a gap with a metal or alloy powder and an effective quantity of a melting point depressant selected from the group consisting of zirconium and hafnium. In a first heating stage a temperature above the liquidus of the braze and below the melting point of the metal or alloy powder is maintained for a period sufficient for the braze to infiltrate the spaces within the metal powder. In a subsequent heating stage a temperature below the liquidus of the braze is maintained while substantial diffusion of the melting point depressant occurs.

The temperature below the liquidus of the braze may be achieved either by reducing the process temperature, or by allowing the liquidus temperature to rise as the melting point depressant diffuses away and as the metal or alloy powder melts or diffuses into the braze and dilutes the melting point depressant.

In a further aspect of the invention, there is provided a braze for liquid phase diffusion bonding of a metal or alloy substrate, comprising: a melting point depressant selected from the group consisting of hafnium and zirconium; and a metal that forms a eutectic with the melting point suppressant; both in effective quantities.

It is an object of the invention to provide a process for liquid phase diffusion bonding that uses boron or other melting point depressants in smaller quantities than hitherto.

It is a further object of the invention to provide a process for liquid phase diffusion bonding that uses melting point depressants other than boron, silicon, or phosphorus that form ductile, rather than brittle, phases in the final joint.

DETAILED DESCRIPTION OF THE INVENTION

Figure 1:
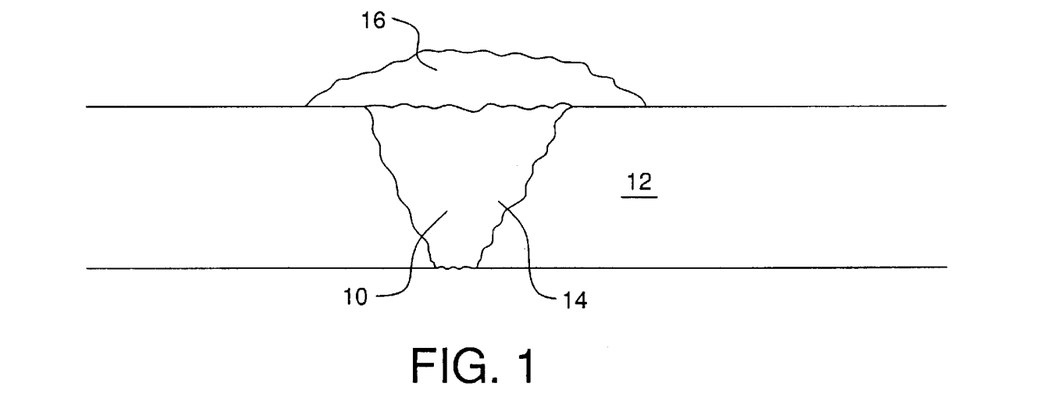
FIGS. 1 to 3 are schematic sectional views through a crack in a metal component, at different stages of the repair process.

In one embodiment of the invention, a crack or joint 10 in a substrate 12 is typically 0.25 mm to 3 mm (0.010" to 0.120") wide. The substrate 12 is typically a vane or blade of an industrial gas turbine. The crack 10 is cleaned mechanically, for example, using a carbide burr, to remove oxides, corrosion products, dirt, and other contaminants. Chemical cleaning is possible as an alternative, but has been found less satisfactory in practice. After cleaning, the crack 10 is preferably 1 mm to 3.175 mm (0.040" to 0.125") wide, and typically about 2 mm (0.080") wide. The crack 10 is filled with a nickel-based or cobalt-based alloy powder 14 (according to whether the substrate consists of a nickel-based or a cobalt-based alloy) that contains no melting point depressants. As is shown in FIG. 1, the powder is filled slightly above the surface of the substrate 12. Some shrinkage and compaction of the fill occurs in processing, and the overfill is necessary if the final repair is to be flush with the surface of the substrate.

A low melting point alloy or braze 16, which contains 1.2% to 1.7% boron as a melting point depressant is applied over the alloy powder. The alloy powder 14 and/or the braze 16 may be formulated as paste. Any suitable binder may be used, and such binders are commercially available. Examples of suitable binders are Vitta Pink binder manufactured by Vitta Corporation, and Wall Colmonoy cement manufactured by Wall Colmonoy Corporation.

Figure 2:
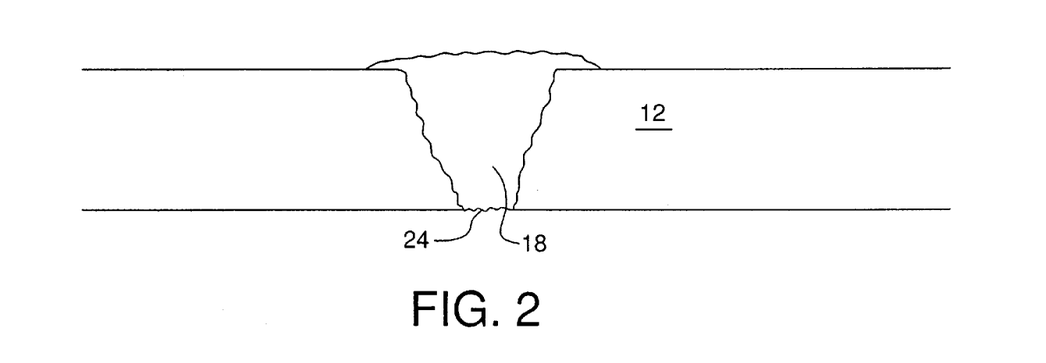
Figure 3:
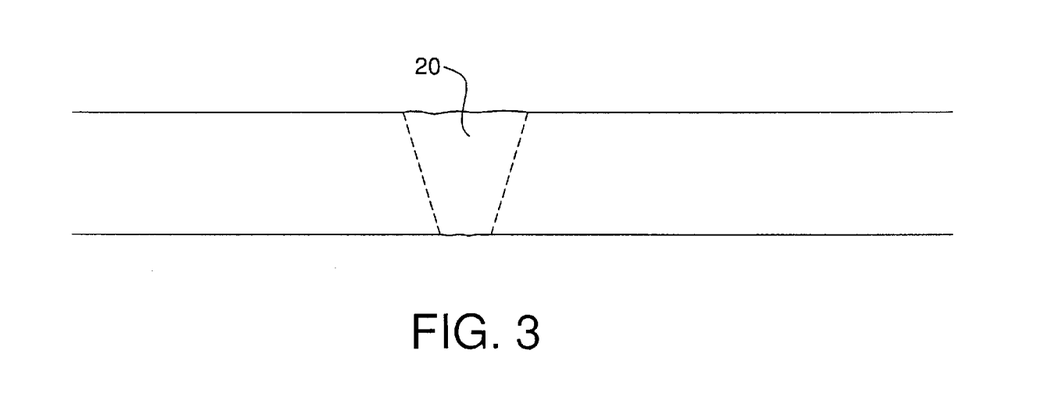

The whole is then heated to a brazing temperature, above the melting point of the braze but below the melting point of the alloy powder or the substrate, for 10 to 45 minutes. At this time, the braze 16 melts, and infiltrates the nickel alloy powder to form a substantially non-porous composite 18 within the crack 10 (see FIG. 2), while the substrate 12 remains solid. It is believed that some melting occurs at the surface of the alloy powder particles, because they become smaller and lose their initial spherical shape. The temperature is then reduced below the liquidus of the braze 16. This inhibits further flow of the braze, and further dissolving and alloying reactions. The temperature is then increased again to diffuse the boron, while remaining below the liquidus of the braze. As the boron diffuses, the liquidus increases, and the temperature can be progressively increased to the original sintering temperature. As the boron disperses, the braze 16 and powder 14 within the crack 10 merge with each other and with the walls of the crack 10 to form a solid and largely continuous repaired component (see FIG. 3). Pores may occur in the repair 20 as a result of shrinkage, but they are found not to exceed 5% porosity, so the resulting component is acceptable as a solid casting. No hot isostatic pressing or other consolidation is needed.

After the liquid-phase diffusion bonding step, the component is typically subjected to a solution heat treatment step, then an optional coating step, then an age heat treatment step. If the component is to be coated to provide additional corrosion or oxidation protection, for example, with an aluminide or MCrAlY coating, the repaired component will be coated between the solution heat treatment step and the age heat treatment step.

In another embodiment of the invention, after the braze 16 is melted the temperature is maintained constant. As the alloy powder 14 melts and alloys with the braze 16, the concentration of melting point depressant in the braze decreases and the melting point of the braze increases until the melting point rises above the actual temperature, and the fill solidifies isothermally. It can be shown that the sintering process effectively ends at this point, confirming that sintering is controlled by liquid-phase dissolving and alloying reactions, and not by solid-state diffusion. The temperature may be maintained for 12 to 24 hours to promote diffusion and dispersion of the boron.

With these two embodiments, a considerable improvement over the process described in the Miglietti et al. paper is observed. The above embodiments give ductility levels of 40% to 75% of the ductility of the base metal. Isolated inclusions of brittle and hard intermetallic phases do still occur, and are believed to affect the low cycle and thermal fatigue properties of the joint. In joints narrower than 0.004" (0.1 mm), alloying and diffusion reactions between the braze and the substrate prevent the formation of intermetallic inclusions, but for practical applications of the invention such small gaps do not always occur.

In a more preferred embodiment of the invention, therefore, boron, silicon, phosphorus, and other melting point depressants that form hard, brittle phases are not used. Instead, zirconium and/or hafnium are used. Zirconium forms a eutectic with nickel at approximately 87% nickel-13% zirconium, having a eutectic temperature of 1170° C. Hafnium forms a eutectic with nickel at approximately 69% nickel-31% hafnium, having a eutectic temperature of 1190° C. The intermetallic phases formed by these materials are much softer than borides: $Ni_5Zr$ has a Vickers hardness with a 50-g load of only 105 HVN, which is much closer to the hardness of the underlying base metal.

In all of these embodiments of the invention, the alloy powder used to fill the crack is preferably a mixture of comparatively fine and comparatively coarse powders, for example, 40 µm and 150 µm (0.0015" and 0.005") grain sizes. Fine-grained structures are associated with good tensile strength and fatigue strength. Coarse-grained structures are associated with good creep and stress rupture properties. The present mixed or hybrid structure has been found to afford, to a considerable extent, the advantages of both fine and coarse structures.

The following examples illustrate the invention:

EXAMPLE 1

The base metal 12 is MAR-M 247 alloy, of nominal composition Ni-0.16C-8Cr-10Co-0.6Mo-10W-3Ta-5.6Al-1Ti-1.5Hf-0.03Zr-0.015B, or MAR-M 247LC alloy, which is a low carbon alloy of nominal composition Ni-8Cr-10Co-0.6Mo-10W-3Ta-5.6Al-1Ti-0.015B-0.03Zr-1.5Hf-0.06C, or CM 247LC alloy, of nominal composition Ni-8Cr-9Co-0.5Mo-10W-3.2Ta-5.6Al-0.7Ti-0.015B-1.4Hf-0.07C. MAR-M 247 is an equiaxed/polycrystalline alloy with excellent resistance to creep, creep rupture, stress rupture, fatigue, and oxidation.

A crack 0.080" (2.0 mm) wide is filled with powdered material 14 of MAR-M 247, MAR-M 247LC, or CM 247LC composition. The filler material 14 may be of the same alloy as the base metal 12. Instead, the base metal may be MAR-M 247, and the filler material may be one of the low-carbon alloys. It is believed that the low-carbon material reduces the formation of brittle carbide phases along the grain boundaries. Using a high-carbon filler with a low-carbon base metal has not been found satisfactory. Test results show that, with MAR-M 247 as the base metal, CM 247LC gives the best results, but the improvement in performance may not justify the high cost of this alloy. MAR-M 247LC gives better results than MAR-M 247. It is at present preferred to use MAR-M 247LC for most purposes. The powder is a mixture of fine (325 mesh) and coarse (125 mesh) powders. A layer of braze 16 consisting of a paste or slurry of Ni-13Zr, Ni-13Zr—Cr—Co—Mo—W—Ta—Nb—Al (liquidus 1225° C.), Ni-31Hf, or Ni-31Hf—Cr—Co—Mo—W—Ta—Al is applied over the filled crack.

The component is heated to 500° C. and held for 15 minutes. The temperature is then raised to 700° C. and held for 15 minutes. These steps serve to burn off any organic binder used in the filler or braze paste. The temperature is then raised to 1000° C. and held for 15 minutes to stabilize the load. The temperature is then raised to between 1230° C. and 1320° C and held for 15 to 45 minutes. This allows the braze 16 to melt and to infiltrate the interstices between the powder grains 14. It has been observed experimentally that the powder grains become smaller and lose their initial spherical shape, suggesting that they are partially melted by the braze. Dwell times in excess of 45 minutes may cause excessive grain growth and incipient melting of the component. (The process temperature is close to the incipient melting point of the substrate material of the component.) Also, if a "through wall" crack occurs, a dwell time in excess of 45 minutes may result in "excessive drop through" so that the braze forms a "ball" at the far end 24 of the crack 10. This may be a problem in a component that has a complex cooling hole pattern, so that the far end 24 of the crack is not readily accessible to remove the ball. The temperature is then reduced to just below the eutectic or liquidus temperature of the braze, and held for from 1 to 36 hours, typically 12 hours, to allow athermal solidification of the fill and solid-state diffusion to occur.

After processing the repaired component or joint, the component is solution heat treated at 1200° C. (2200° F.) for 2 hours, then coated with either an aluminide or MCrAlY coating. The coating is diffused at 1975° F. (1075° C.) for 4 hours, and then aged at 1600° F. (870° C.) for 20 hrs.

EXAMPLE 2

The same process is followed as for Example 1, except that the temperature is not reduced below the eutectic or liquidus temperature after 45 minutes. Instead, the temperature of 1230° C. to 1320° C. is maintained for up to 36 hours. As the filler alloy powder melts into the braze, the concentration of Hf or Zr in the braze is reduced, and its eutectic or liquidus temperature increases. When the liquidus temperature exceeds the brazing temperature, the filler solidifies isothermally. This process may be preferred if grain growth, melting of the substrate, and drop through are not concerns, because the liquid phase process is self-terminating, so that the final product quality is more easily controlled.

EXAMPLE 3

A crack in a component of MAR-M 247, MAR-M 247LC, or CM 247LC material is filled with powder of appropriate nominal composition, as discussed in Example 1. The powder may be mixed with a binder to form a paste or slurry. Over the crack, a layer of braze mixed with MAR-M 247, MAR-M 247LC, or CM 247LC powder, as appropriate, is applied. The mixture may be from 30% to 90% by weight of braze. The braze may be any of the brazes mentioned in Example 1. The braze mixture is in the form of a paste or slurry. The sequence of temperatures of Example 1 or Example 2 may be used.

EXAMPLE 4

A crack is prepared and heated to 1000° C. as described above for Example 1. The component is then heated to a temperature below the eutectic or liquidus temperature of the braze, but high enough for solid-state sintering of the filler powder. The component is held at this temperature for 1 to 4 hours. The temperature is then increased to 1230° C. to 1320° C., and the process proceeds as described for Example 1 or Example 2.

EXAMPLE 5

A crack in a component of MAR-M 247 alloy is filled with a mixture of braze with powdered MAR-M 247 material. The braze may be from 30% to 60% by weight of the mixture. The braze may be any of those described in Example 1. The temperature sequence is as described above for Example 1 or Example 2. As in Example 1, the materials may be MAR-M 247LC or CM 247LC instead of MAR-M 247.

EXAMPLE 6

The processes of Examples 1 to 5 may be applied to components of other alloys, such as In738, In713, In713, In939, MAR-M 200, Rene 80, or Waspaloy. The alloy powder used as the filler, and the alloy component of the braze mixture in Example 3, are selected to match the base metal of the component. Alternatively, the alloy powder used as the filler, and the alloy component of the braze mixture in Example 3, can be MAR-M 247, MAR-M 247LC, or CM 247LC powder. This will result in a repair having superior mechanical properties when compared with the original substrate material such as In738, In713, In100, In939, Rene 80, or Waspaloy. Test results show that CM 247LC tends to give the best results, and that MAR-M 247LC tends to give better results than MAR-M 247. The fact that the original component has sustained fatigue cracking sufficiently severe to require repair may be seen as implying that the original substrate material is not adequate to its use, and therefore that a repair superior to the original material may improve the subsequent service life of the component. However, the extra improvement in performance that results from the use of CM 247LC may not justify the high cost of this alloy. It is at present preferred to use MAR-M 247LC in most cases.

EXAMPLE 7

Siemens V84.2, Row 2 vanes are cast from In738 alloy having a nominal composition of Ni-16Cr-8.5Co-1.75Mo-2.6W-1.75Ta-0.9Nb-3.4Al-3.4Ti-0.1Zr-0.17C. Cracks up to 1.5 mm (0.059") wide were found in actual vanes, so test results have been prepared for a 1.5 mm gap. However, this technique has been used successfully with gaps up to 10 mm wide. Test specimens were prepared from rectangular sections of investment cast In738 12.5 mm×12.5 mm×55.9 mm. The specimen was cut in half, and the mating surfaces were ground flat and grit blasted with silicon carbide. A 1.5 mm gap between the mating surfaces was set with molybdenum stock shims, and filled with filler paste having a composition corresponding to that of ln738. A braze paste consisting of Ni, Co, Cr, Al, Ta, Mo, W, Y, Zr, Hf, and B, in which the effective melting point depressant was 1.5% by weight of boron, was applied around the filler paste. The specimen was processed at 1200° C. (2192° F.) for 20 hours, slowly cooled to 1121° C. (2050° F.) and aged at 1121° C. (2050° F.) for 2 hours, and then aged at 843 ° C. (1550° F.) for 24 hours. In production, the repair will be coated with a MCRAlY coating and a Thermal Barrier Coating. The MCRAlY coating is diffused at 1975° F. (1080° C.) for 4 hours.

Values for tensile test results are shown in Table 1 for the test specimens, for an actual sample taken from the root of a W501F, $1^{st}$ Stage blade, for In 738 parent alloy (taken from the Metals Handbook, Vol. 3, $9^{th}$ Edition) and for a conventional brazing mixture. The conventional mixture consisted of 50% In 738 and 50% BRB brazing mixture with a composition of Ni-13.5Cr-7.5Co-4Al-2.5B. Values for the stress rupture properties of the same materials are shown in Table 2.

TABLE 1

| Material | Temperature °C. | Temperature °F. | Tensile Strength MPa | Tensile Strength ksi | Yield Strength MPa | Yield Strength ksi | Elongation % | RA % |
|---|---|---|---|---|---|---|---|---|
| Example 7 | 21 | 70 | 1011 | 146.5 | 882 | 127.8 | 3.1 | 4.7 |
| Example 7 | 21 | 70 | 886 | 128.4 | 866 | 125.5 | 1.4 | 3.6 |
| IN 738 | 21 | 70 | 1050 | 152 | 865 | 125.4 | 5 | 5 |
| Blade root | 21 | 70 | 828 | 120 | 759 | 110 | 3 | 3 |
| Conventional | 21 | 70 | 527 | 76.4 | 527 | 76.4 | 1.4 | 2.4 |
| Conventional | 21 | 70 | 502 | 72.8 | 502 | 72.8 | 1.8 | 2.2 |
| Conventional | 21 | 70 | 559 | 81 | 559 | 81 | 1.0 | 2.9 |
| Example 7 | 650 | 1200 | 827 | 120 | 671 | 97.3 | 6.0 | 5.6 |
| Example 7 | 650 | 1200 | 765 | 111 | 661 | 95.8 | 3.3 | 4.0 |
| Example 7 | 650 | 1200 | 753 | 109 | 682 | 98.9 | 4.1 | 3.7 |
| IN 738 | 650 | 1200 | 850 | 123 | 655 | 95 | 5 | 5 |
| Conventional | 650 | 1200 | 322 | 46.7 | 322 | 46.7 | 2.5 | 1.6 |
| Conventional | 650 | 1200 | 441 | 63.9 | 441 | 63.9 | 1.2 | 1.9 |
| Conventional | 650 | 1200 | 338 | 49 | 338 | 49 | 1.9 | 5.2 |
| Example 7 | 760 | 1400 | 908 | 131.6 | 747 | 108.3 | 3.9 | 5.9 |
| Example 7 | 760 | 1400 | 944 | 136.8 | 768 | 111.3 | 3.8 | 5.6 |
| IN 738 | 760 | 1400 | 965 | 140 | 795 | 115 | 6 | NR |
| Example 7 | 982 | 1800 | 412 | 59.7 | 319 | 46.2 | 2.0 | 8.2 |
| Example 7 | 982 | 1800 | 372 | 53.9 | 317 | 45.9 | 1.6 | 6.1 |
| IN 738 | 982 | 1800 | 435 | 63 | 325 | 47.1 | 6.5 | NR |

NR = Not Reported;
IN 738 = Data from Materials Handbook.

TABLE 2

| | Temperature °C. | Temperature °F. | Stress Level MPa | Stress Level ksi | Time To Failure hrs | Elongation % | RA % |
|---|---|---|---|---|---|---|---|
| Example 7 | 843 | 1550 | 345 | 50 | 190.3 | 1.7 | NR |
| Example 7 | 843 | 1550 | 345 | 50 | 93.7 | 1.9 | NR |
| Example 7 | 843 | 1550 | 345 | 50 | 89 | 2.3 | NR |
| Example 7 | 843 | 1550 | 345 | 50 | 97.3 | 1.8 | NR |
| IN 738 | 843 | 1550 | 345 | 50 | 100 | 5 | 5 |
| Conventional | 843 | 1550 | 345 | 50 | 11.9 | NR | NR |
| Conventional | 843 | 1 550 | 345 | 50 | 7.4 | NR | NR |
| Example 7 | 829 | 1525 | 345 | 50 | 203.37 | 4.4 | NR |
| IN 738 | 829 | 1525 | 345 | 50 | 223.02 | 6.7 | NR |
| Example 7 | 982 | 1800 | 124.2 | 18 | 453.2* | 5.5 | NR |
| IN 738 | 982 | 1800 | 124.2 | 18 | 807.2 | 5.2 | NR |

*Failure occurred in substrate metal

As may be seen from Table 1, the test specimens according to Example 7 showed properties considerably superior to those of the conventional braze, and close to the actual In 738 sample.

EXAMPLE 8

Alstom Tornado, $2^{nd}$ Stage stator segments are cast from In 939 alloy having a nominal composition of Ni-22.4Cr-19Co-2W-1.4Ta-1Nb-1.9Al-3.7Ti-0.1Zr-0.15C. Test specimens of In939 material were prepared and processed as described in Example 7, except that the filler metal was In939 to correspond to the substrate and that they were processed at 2175° F. (1190° C.) for 24 hrs, solution heat treated at 2125° F. (1165° C.) for 4 hrs, homogenized at 1830° F. (1000° C.) for 6 hrs, and aged for 24 hours at 900° C. (1650° F.) and for 16 hours at 700° C. (1300° F.). In production, the repair may be coated, after the step of aging for 24 hours at 900° C. (1650° F.), with an aluminide coating such as that supplied by Sermatech International, Inc. under the name SERMALOY J, which will be diffused at 1650 ° F. (900° C.) for 2 hours.

Figure 4:
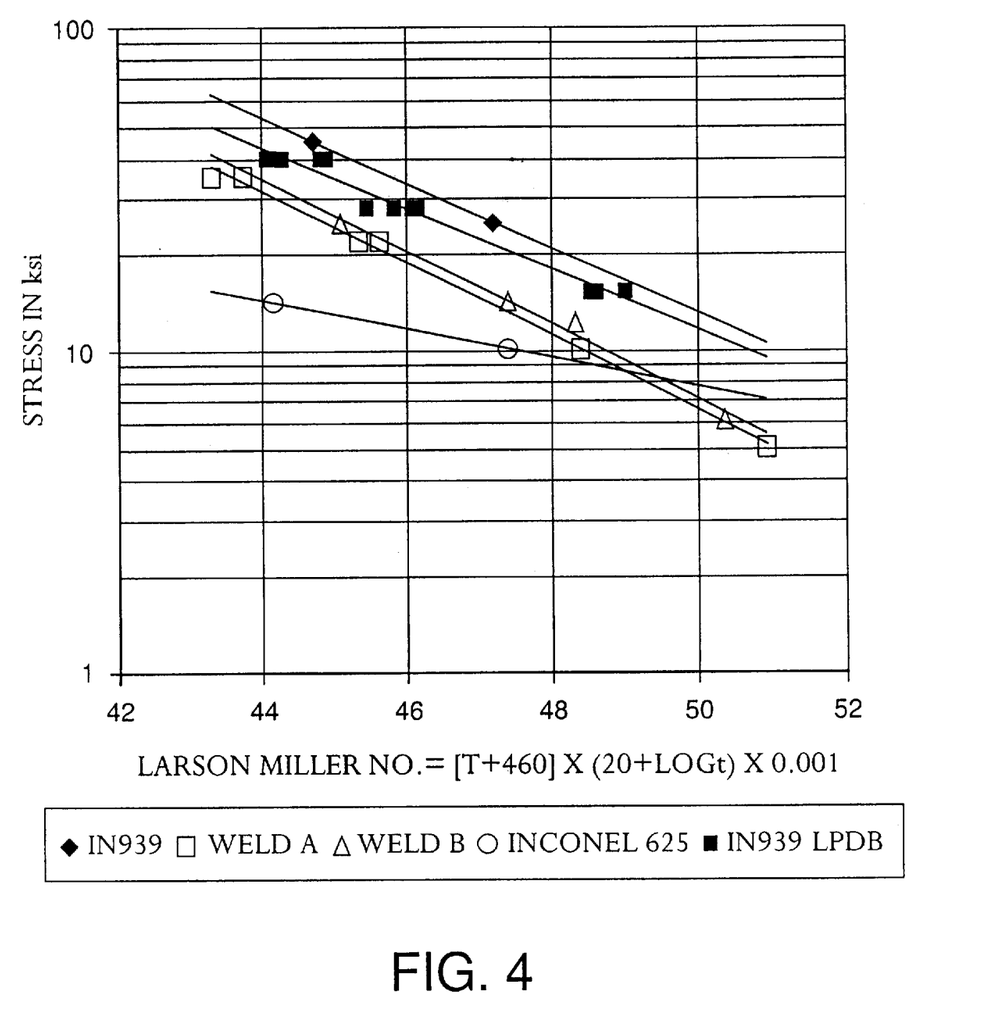
FIG. 4 is a graph.

Values for tensile test results are shown in Table 3 for the test specimens and for a sample of In 939 material taken from an actual shroud buttress section. FIG. 4 shows the stress rupture properties of the finished test specimen, of a sample of In 939 base metal, and of comparison samples of conventional crack-repair materials. It will be seen that the properties of the In 939 test sample according to Example 8 are 90% of the properties of the In 939 base metal.

TABLE 3

| Material | Temperature °C. | Temperature °F. | Tensile Strength MPa | Tensile Strength ksi | Yield Strength MPa | Yield Strength ksi | Elongation % | RA % |
|---|---|---|---|---|---|---|---|---|
| Example 8 | 21 | 70 | 920 | 133.3 | 670 | 97.1 | 2.2 | 3.6 |
| Example 8 | 21 | 70 | 859 | 124.5 | 696 | 100.9 | 1.8 | 4.3 |
| Example 8 | 21 | 70 | 817 | 118.4 | 750 | 108.7 | 1.7 | 7.7 |
| Example 8 | 21 | 70 | 999 | 144.8 | 651 | 94.3 | 1.5 | 3.0 |
| Shroud | 21 | 70 | 897 | 130 | 690 | 100 | 3 | 5.0 |
| Example 8 | 650 | 1200 | 768 | 111.3 | 625 | 90.6 | 1.5 | 4.0 |
| Example 8 | 650 | 1200 | 860 | 124.7 | 654 | 94.8 | 2.1 | 5.1 |
| Shroud | 650 | 1200 | 863 | 125.1 | 621 | 90 | 3 | 5.0 |

EXAMPLE 9

Samples were prepared substantially as described above in Examples 7 and 8, but using a fill material with a composition matching that of Rene 80 alloy. The samples were processed at 1220° C. for 20 hours, then stabilized at 1095° C. for 4 hours, then aged at 1050° C. for 4 hours and at 845° C. for 16 hours. Values for test results for tensile properties are shown in Table 4, and for stress rupture properties are shown in Table 5, for the test sample and for actual specimens of Rene 80 base metal. The Rene 80 base metal specimens were in the solution and aged condition and not in the Hipped, solution and aged condition.

TABLE 4

| Material | Temperature °C. | °F. | Tensile Strength MPa | Yield Strength MPa | Elongation % | RA % |
|---|---|---|---|---|---|---|
| Example 9 | 25 | 77 | 892.9 | 857.7 | 0.6 | 1.5 |
| Rene 80 | 25 | 77 | 870.1 | 700.4 | 1.8 | 3.5 |
| Example 9 | 871 | 1600 | 103.2 | 86.6 | 1.9 | 1.2 |
| Rene 80 | 871 | 1600 | 91.9 | 63.2 | 6.6 | 8.1 |

TABLE 5

| Material | Test temperature °C. | Stress MPa | Time to rupture Hours | Elongation % | RA % |
|---|---|---|---|---|---|
| Example 9 | 871 | 345 | 22.6 | 4.9 | 6.4 |
|  | 871 | 311 | 59 | 3.9 | 7.7 |
|  | 871 | 276 | 124 | 3.0 | 11.3 |
|  | 927 | 242 | 26.1 | 3.7 | 7.4 |
| Rene 80 | 871 | 345 | 18.1 | NR | NR |
|  | 871 | 311 | 44 | 10.2 | 18.4 |
|  | 871 | 276 | 122.6 | NR | NR |
|  | 927 | 242 | 31.5 | NR | NR |

In summary the tensile and stress rupture properties of the wide gap joint repairs for In 738, In 939, and Rene80 according to Examples 7, 8, and 9 are equivalent to those of the base metal.

The present invention may be embodied in other specific forms without departing from the spirit or essential attributes thereof and, accordingly, reference should be made to the appended claims, rather than to the foregoing specification, as indicating the scope of the invention. For example, although the foregoing Examples use nickel-based alloys, the skilled reader will understand how the invention may be applied similarly to cobalt-based alloys.

What is claimed is:

1. A method of liquid-phase diffusion bonding of a metal or alloy substrate, comprising the steps of:
    filling a gap with a metal or alloy powder having spaces within it and substantially free from melting point depressants;
    applying over the powder a braze consisting of a metal or alloy containing an effective quantity of a melting point depressant and having a liquidus;
    maintaining in a first heating stage a temperature above the liquidus of the braze and below the melting point of the powder for a period sufficient for the braze to infiltrate the spaces within the metal powder and thereby to form a substantially non-porous composite;
    reducing the temperature from a level above the liquidus of the braze to a level below the liquidus of the braze after said first heating stage; and
    maintaining a temperature below the liquidus of the braze in a subsequent heating stage wherein substantial diffusion of the melting point depressant occurs.

2. A method according to claim 1, comprising the step of increasing the temperature during said subsequent heating stage as said melting point depressant diffuses away and the liquidus increases.

3. A method according to claim 1, wherein said metal or alloy powder has a composition substantially the same as the composition of said metal or alloy substrate.

4. A method according to claim 1, wherein said metal or aloy substrate in a nickel-based or cobalt-based alloy, and said metal or alloy powder is alloy of nominal composition Ni-0.16C-8Cr-10Co-0.6Mo-10W-3Ta-5.6Al-1Ti-1.5Hf-0.03Zr-0.015B, Ni-8Cr-10Co-0.6Mo-10W-3Ta-5.6Al-1Ti-0.015B-0.03Zr-1.5Hf-0.06C, Ni-8Cr-9Co-0.5Mo-10W-3.2Ta-5.6Al-0.7Ti-0.015B-1.4Hf-0.07C, or Co-10Ni-23.5Cr-7W-2.5Ta-0.2Ti-0.6C-0.5Zr, respectively.

5. A method according to claim 1, wherein the melting point depressant comprises 1.2% to 1.7% by weight of boron.

6. A method according to claim 1, wherein the completed bond has a ductility at least 40% of that of the metal or alloy substrate.

7. A method according to claim 1, wherein the gap is selected from the group consisting of cracks, joints, dents, and pitting.

8. A method of liquid phase diffusion bonding of a nickel- or cobalt-based metal or alloy substrate, comprising the steps of:
    filling a gap with a nickel- or cobalt-based metal or alloy powder similar in composition to the substrate and substantially free from melting point depressants, said powder having spaces within it;
    applying over the powder a braze containing an effective quantity of a melting point depressant selected from the group consisting of zirconium and hafnium and having a liquidus;
    maintaining in a first heating stage a temperature above the liquidus of the braze and below the melting point of the powder for a period sufficient for the braze to infiltrate the spaces within the metal powder; and
    maintaining a temperature below the liquidus of the braze in a subsequent heating stage wherein substantial diffusion of the melting point depressant occurs.

9. A method according to claim 8, wherein the substrate and the alloy powder are nickel-based, and the braze consists essentially of nickel and the melting point depressant.

10. A method according to claim 8, wherein the substrate and the alloy powder are cobalt-based, and the braze consists essentially of cobalt and the melting point depressant.

11. A method according to claim 8, wherein the braze comprises a eutectic mixture of the melting point depressant.

12. A method according to claim 11, wherein the braze comprises 26% to 34% by weight of hafnium.

13. A method according to claim 11, wherein the braze comprises 11% to 19% or 40% to 60% by weight of zirconium.

14. A method according to claim 8, wherein said metal or alloy powder has a composition substantially the same as the composition of said metal or alloy substrate.

15. A method according to claim 8, wherein said metal or alloy powder is alloy of nominal composition Ni-0.16C-8Cr-10Co-0.6Mo-10W-3Ta-5.6Al-1Ti-1.5Hf-0.03Zr-0.015B, Ni-8Cr-10Co-0.6Mo-10W-3Ta-5.6Al-1Ti-0.015B-0.03Zr-1.5Hf-0.06C, Ni-8Cr-9Co-0.5Mo-10W-3.2Ta-5.6Al-0.7Ti-0.015B-1.4Hf-0.07C, or Co-10Ni-23.5Cr-7W-2.5Ta-0.2Ti-0.6C-0.5Zr.

16. A method according to claim 8, wherein when the method is completed the material filling the gap has a ductility at least 40% of that of the metal or alloy substrate.

17. A method of liquid phase diffusion bonding of a metal or alloy substrate, comprising the steps of:

filling a gap with a metal or alloy powder having spaces within it and a braze including an effective quantity of a melting point depressant selected from the group consisting of zirconium and hafnium and having a liquidus;

maintaining in a first heating stage a temperature above the liquidus of the braze and below the melting point of the powder for a period sufficient for the braze to infiltrate the spaces within the metal powder; and maintaining a temperature below the liquidus of the braze in a subsequent heating stage wherein substantial diffusion of the melting point depressant occurs.

18. A method according to claim 17, comprising filling the gap with a mixture of powder of an alloy similar in composition to the substrate and a powder of a braze comprising the melting point depressant.

19. A method according to claim 17, wherein the braze comprises an element as the principal ingredient thereof and the substrate comprises the same element as the principal ingredient thereof.

20. A method according to claim 17, wherein the substrate and the alloy powder are nickel-based, and the braze consists essentially of nickel and the melting point depressant.

21. A method according to claim 17, wherein the substrate and the alloy powder are cobalt-based, and the braze consists essentially of cobalt and the melting point depressant.

22. A method according to claim 17, wherein the braze comprises a eutectic mixture of the melting point depressant.

23. A method according to claim 17, comprising filling the gap with powder prepared with a binder in a form selected from the group consisting of pastes and slurries.

24. A method according to claim 23, comprising the step of burning off the binder before the first heating stage.

* * * * *

(12) INTER PARTES REEXAMINATION CERTIFICATE (0006th)
United States Patent
Miglietti (10) Number: US 6,520,401 C1
(45) Certificate Issued: Aug. 22, 2006

(54) DIFFUSION BONDING OF GAPS

(75) Inventor: Warren Martin Andre Miglietti, Manchester, CT (US)

(73) Assignee: Sermatech International, Inc., Limerick, PA (US)

Reexamination Request:
No. 95/000,047, Jun. 24, 2004

Reexamination Certificate for:
Patent No.: 6,520,401
Issued: Feb. 18, 2003
Appl. No.: 09/947,889
Filed: Sep. 6, 2001

(51) Int. Cl.
*B23K 20/22* (2006.01)
*B23K 31/02* (2006.01)

(52) U.S. Cl. .................. 228/194; 228/233.2; 228/248.1
(58) Field of Classification Search ........................ None
See application file for complete search history.

(56) References Cited

U.S. PATENT DOCUMENTS 4,743,514 A * 5/1988 Strangman et al. ......... 428/678
5,156,321 A   10/1992 Liburdi et al.

OTHER PUBLICATIONS

Sparling and Liburdi, Liburdi Powder Metallurgy New Compositions for High Strength Repairs of Turbine Components, ASME GT–2002–30537, Amsterdam, The Netherlands, Jun. 3–5, 2002.*

Miglietti et al., The Microstructure, Mechanical Properties and Coatability of Diffusion Brazed CMSX–4 Single Crystal, ASME paper 96–GT–467, International Gas Turbine & Aeroengine Congress & Exhibition, Birmingham, UK, Jun. 10–13, 1996.

* cited by examiner

*Primary Examiner*—Kiley S. Stoner (57) ABSTRACT

A process for diffusion bonding of cracks and other gaps in high-temperature nickel and cobalt alloy components is described. The gap is filled with alloy powder matching the substrate alloy, or with an alloy of superior properties, such as MAR-M 247, MAR-M 247LC, or CM 247LC. A braze containing a melting point depressant is either mixed into the alloy powder or applied over it. The depressant is preferably hafnium, zirconium, or low boron. The component is heated for 15–45 minutes above the melting point of the braze, which fills the spaces between the alloy powder particles. The component is diffused at a temperature above or below the liquidus of the braze and solution heat-treated and aged at a temperature at which the braze and alloy mixture in the gap is solid, but the depressant diffuses away.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1–24 is confirmed.

* * * * *